United States Patent
Davis et al.

(10) Patent No.: US 10,794,182 B1
(45) Date of Patent: Oct. 6, 2020

(54) SYSTEMS AND METHODS FOR CONTROLLING A LONGWALL MINING SYSTEM BASED ON A FORWARD-LOOKING MINE PROFILE

(71) Applicant: Joy Global Underground Mining LLC, Warrendale, PA (US)

(72) Inventors: Lee Davis, Cranberry Township, PA (US); Matthew Beilstein, Mercer, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

(21) Appl. No.: 16/359,051

(22) Filed: Mar. 20, 2019

(51) Int. Cl.
*E21C 35/08* (2006.01)
*E21C 35/24* (2006.01)
*E21C 41/16* (2006.01)
*G06T 7/13* (2017.01)

(52) U.S. Cl.
CPC .............. *E21C 35/24* (2013.01); *E21C 35/08* (2013.01); *E21C 41/16* (2013.01); *G06T 7/13* (2017.01); *G06T 2207/30181* (2013.01)

(58) Field of Classification Search
CPC .................................. E21C 35/08; G06T 7/13
See application file for complete search history.

(56) References Cited

U.S. PATENT DOCUMENTS

| 8,128,176 B2 | 3/2012 | Klabisch et al. |
| 8,998,343 B2 | 4/2015 | Ahler et al. |
| 9,650,893 B2 | 5/2017 | Herdle |
| 9,726,017 B2 | 8/2017 | Siegrist et al. |
| 2010/0194175 A1* | 8/2010 | Hackelboerger ........ E21C 35/12 299/1.6 |
| 2013/0154341 A1* | 6/2013 | Niederriter ............. E21C 27/02 299/42 |
| 2017/0217689 A1 | 8/2017 | Holden et al. |
| 2017/0226853 A1 | 8/2017 | Katrycz et al. |
| 2017/0276777 A1 | 9/2017 | Rimmington |

FOREIGN PATENT DOCUMENTS

DE         3039814 A1     5/1982

* cited by examiner

*Primary Examiner* — Sunil Singh
(74) *Attorney, Agent, or Firm* — Michael Best & Friedrich LLP

(57) ABSTRACT

A controller for controlling a longwall mining system. The controller includes a non-transitory computer readable medium and a processor. The controller also includes computer executable instructions stored in the computer readable medium for controlling operation of the industrial machine to receive a first signal from a first camera, receive a second signal from a second camera, analyze at least one of the first signal and the second signal to identify one or more edges of a structure of the longwall mining system ahead of a shearer in either a first direction of travel of the shearer or a second direction of travel of the shearer, generate a forward-looking mine profile based on the one or more edges, and control the longwall mining system based on the forward-looking mine profile.

22 Claims, 10 Drawing Sheets

SYSTEMS AND METHODS FOR CONTROLLING A LONGWALL MINING SYSTEM BASED ON A FORWARD-LOOKING MINE PROFILE

BACKGROUND

Embodiments described herein relate to a longwall mining system.

SUMMARY

Longwall mining begins with identifying a material seam to be mined and "blocking out" the seam into panels by excavating roadways around the perimeter of each panel. During excavation of the seam (e.g., extraction of coal), select pillars of material can be left unexcavated between adjacent panels to assist in supporting the overlying geological strata. The material panels are excavated by a longwall mining system, which includes components such as automated electro-hydraulic roof supports, a material shearing machine (i.e., a longwall shearer), and an armored face conveyor ("AFC") parallel to the material face. As the shearer travels the width of the material face to remove a layer or web of material, the roof supports automatically advance to support the roof of the newly exposed section of strata. The AFC is then advanced by the roof supports toward the material face by a distance equal to the depth of the material layer previously removed by the shearer. Advancing the AFC toward the material face in such a manner allows the shearer to engage with the material face and continue shearing material away from the material face.

The shearer can be monitored to help ensure that the longwall mining system does not experience a "loss of horizon" (i.e., the mining system has some sense of what lies ahead of the shearer). Maintaining the horizon in a longwall mining system allows a more efficient extraction of material by maximizing extraction of material without weakening support for overlying geological strata. For example, loss of horizon in a longwall mining system can cause degradation of material quality (e.g., when other non-coal material is being extracted along with coal), deterioration of face alignment, or formation of cavities by compromising overlying seam strata. In some circumstances, loss of horizon may cause damage to the longwall mining system itself (e.g., from a roof support canopy colliding with the shearer).

Conventionally, maintaining the horizon in a longwall mining system involves using roof support data, armored face conveyer ("AFC") data, shearer position data, and other longwall mining system data to construct a backward-looking mine profile. The mine profile is backward-looking in that it relies on past sensor data to determine the conditions of the mine as they were previously (i.e., during a previous shearer cycle along a material face). For example, the backward-looking mine profile can characterize a pan-line of the mining system using the angular position measurements of the shearer (e.g., roll and pitch angles) and lateral position measurements of the shearer (e.g., position along the material face determined using haulage sensors). The result of a backward-looking mine profile is the ability to alert an operator or the longwall mining system of past conditions of a material face or past inefficiencies in the mining process.

A forward-looking mine profile, on the other hand, enables a longwall mining system to be proactively controlled in preparation for the conditions of the mine or material face that the shearer is about to experience. For example, the longwall mining system can include one or more cameras for capturing images or video within a mine. The cameras can be mounted on a shearer, a roof support, or another structure of the longwall mining system. The cameras are used to capture images or video of an area in front of the shearer in the direction of motion of the shearer. A controller receives the signals from the cameras and processes them, for example, using edge detection techniques and optical flow image processing. After the controller processes the signals, the controller can identify and evaluate structures ahead of the shearer along the path in front of the shearer. For example, the controller can identify the pan-line and determine the shape of the pan-line the shearer is about to experience. The determined shape of the pan-line can be included in the forward-looking mine profile that can then be used to control the longwall mining system. The determined shape of the pan-line can also be compared to a prior imaged version of the pan-line or prior sensor data related to the pan line so the controller can determine changes to the pan-line from previous shearer cycles.

Embodiments described herein provide a longwall mining system that includes an armored face conveyer, a shearer, a first camera, a second camera, and a controller. The shearer is configured to travel along the armored face conveyor in a first direction or a second direction. The shearer includes a shearer housing, a first cutter drum extended in the first direction away from the shearer housing, and a second cutter drum extended in the second direction away from the shearer housing. The first camera is configured to generate a first signal associated with the first direction of travel for the shearer. The second camera is configured to generate a second signal associated with the second direction of travel for the shearer. The controller includes a non-transitory computer readable medium and a processor. The controller also includes computer executable instructions stored in the computer readable medium for controlling operation of the industrial machine to receive the first signal from the first camera, receive the second signal from the second camera, analyze at least one of the first signal and the second signal to identify one or more edges of a structure of the longwall mining system ahead of the shearer in either the first direction or the second direction, generate a forward-looking mine profile based on the one or more edges, and control the longwall mining system based on the forward-looking mine profile.

Embodiments described herein also provide a computer-implemented method for controlling a longwall mining system. The longwall mining system includes an armored face conveyor, a shearer configured to travel along the armored face conveyor in a first direction or a second direction, a first camera, a second camera, and a controller. The method includes receiving a first signal from the first camera, receiving a second signal from the second camera, analyzing at least one of the first signal and the second signal to identify one or more edges of a structure of the longwall mining system ahead of the shearer in either the first direction of travel of the shearer or the second direction of travel of the shearer, generating a forward-looking mine profile based on the one or more edges, and controlling the longwall mining system based on the forward-looking mine profile.

Embodiments described herein also provide a controller for controlling a longwall mining system. The controller includes a non-transitory computer readable medium and a processor. The controller also includes computer executable instructions stored in the computer readable medium for controlling operation of the industrial machine to receive a first signal from a first camera, receive a second signal from a second camera, analyze at least one of the first signal and the second signal to identify one or more edges of a structure of the longwall mining system ahead of a shearer in either a first direction of travel of the shearer or a second direction of travel of the shearer, generate a forward-looking mine profile based on the one or more edges, and control the longwall mining system based on the forward-looking mine profile.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to the control of a longwall mining system based on a forward-looking mine profile. The longwall mining system includes a plurality of roof supports, a shearer, and an armored face conveyor ("AFC"). One or more cameras are mounted on the shearer, the roof supports, or both the shearer and the roof supports such that the one or more cameras generate signals related to an area in front of the shearer (i.e., the area in front of the shearer in the direction of travel of the shearer). Rather than rely solely on past sensor data related to the movement of the shearer and controlling the longwall mining system based on a backward-looking mine profile, a controller uses the signals from the one or more cameras to generate a forward-looking mine profile. The forward-looking mine profile includes one or more detected edges of structures associated with the longwall mining system. The one or more detected edges are detected in the image or video signals using edge detection techniques and optical flow image processing. Based on, for example, the shape of the detected edges and known shapes of structures associated with the longwall mining system, the controller is able to identify structures ahead of the shearer. From the detected edges and structures, the controller can then identify, among other things, the shape of a pan-line or the path to be followed by the shearer as it traverses the AFC. The determined shape of the pan-line can be included in the forward-looking mine profile and be used to control the longwall mining system.

Figure 1:
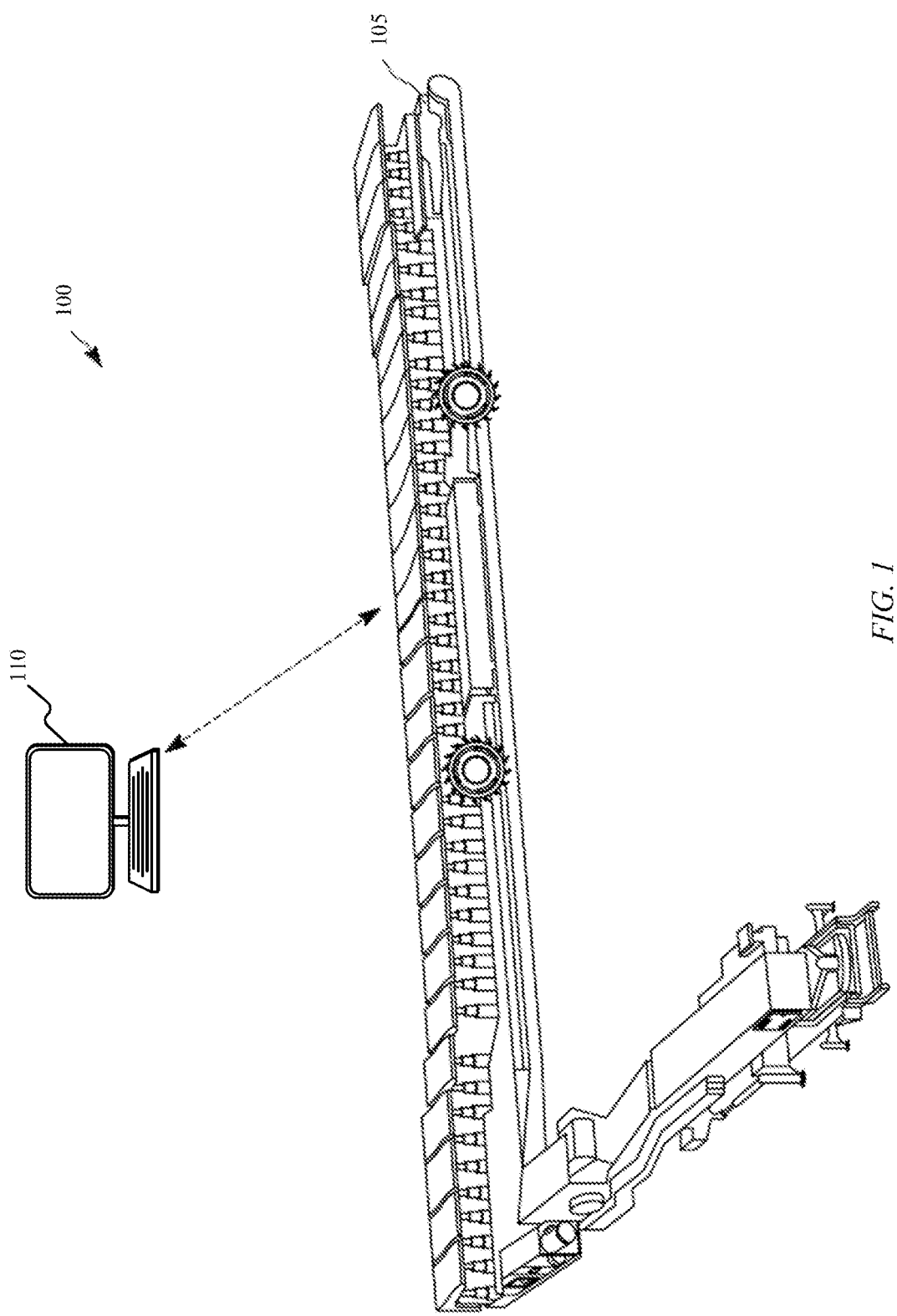
FIG. 1 illustrates an extraction system, according to embodiments described herein.

FIG. 1 illustrates an extraction system 100. The extraction system 100 includes a longwall mining system 105 and a mine monitoring system 110. The extraction system 100 is configured to extract a material or product (e.g., coal) from a mine in an efficient manner. The longwall mining system 105 physically extracts material from an underground mine. The mine monitoring system 110 monitors the operation of the longwall mining system 105 to ensure that the extraction of material remains efficient.

Figure 2:
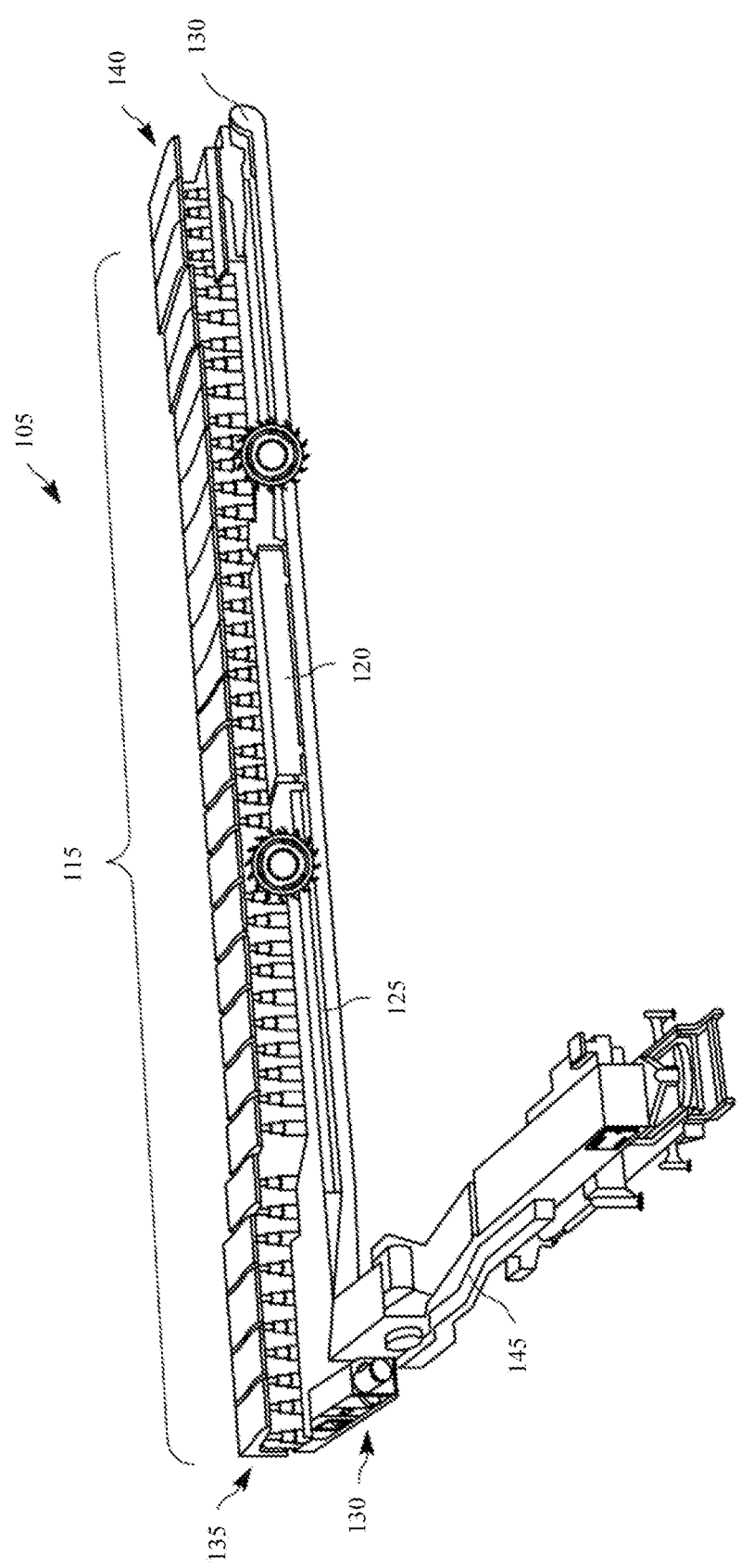
FIGS. 2 and 3 illustrate a longwall mining system of the extraction system of FIG. 1, according to embodiments described herein.

FIG. 2 illustrates the longwall mining system 105 including roof supports 115 and a shearer 120. The roof supports 115 are interconnected parallel to a material face (see FIG. 5) by electrical and hydraulic connections. The roof supports 115 shield the shearer 120 from the overlying geological strata. The number of roof supports 115 used in the longwall mining system 105 depends on the width of the material face being mined since the roof supports 115 are intended to protect the full width of the material face from the strata. The shearer 120 is propagated along the line of the material face by an AFC 125, which has a dedicated rack bar for the shearer 120 running parallel to the material face between the face itself and the roof supports 115. The AFC 125 also includes a conveyor parallel to the shearer rack bar, such that excavated material falls onto the conveyor to be transported away from the face. The conveyor and rack bar of the AFC 125 are driven by AFC drives 130 located at a maingate 135 and a tailgate 140, which are at distal ends of the AFC 125. The AFC drives 130 allow the AFC 125 to continuously transport material toward the maingate 135 (left side of FIG. 2). The AFC drives 130 also allow the shearer 120 to be hauled bi-directionally along the rack bar of the AFC 125 and across the material face. In some embodiments, depending upon the specific mine layout, the layout of the longwall mining system 105 can be different than described above. For example, the maingate 135 can be on the right distal end of the AFC 125 and the tailgate 140 can be on the left distal end of the AFC 125. The longwall mining system 105 also includes a beam stage loader ("BSL") 145 arranged perpendicularly at the maingate 135 of the AFC 125.

Figure 3:
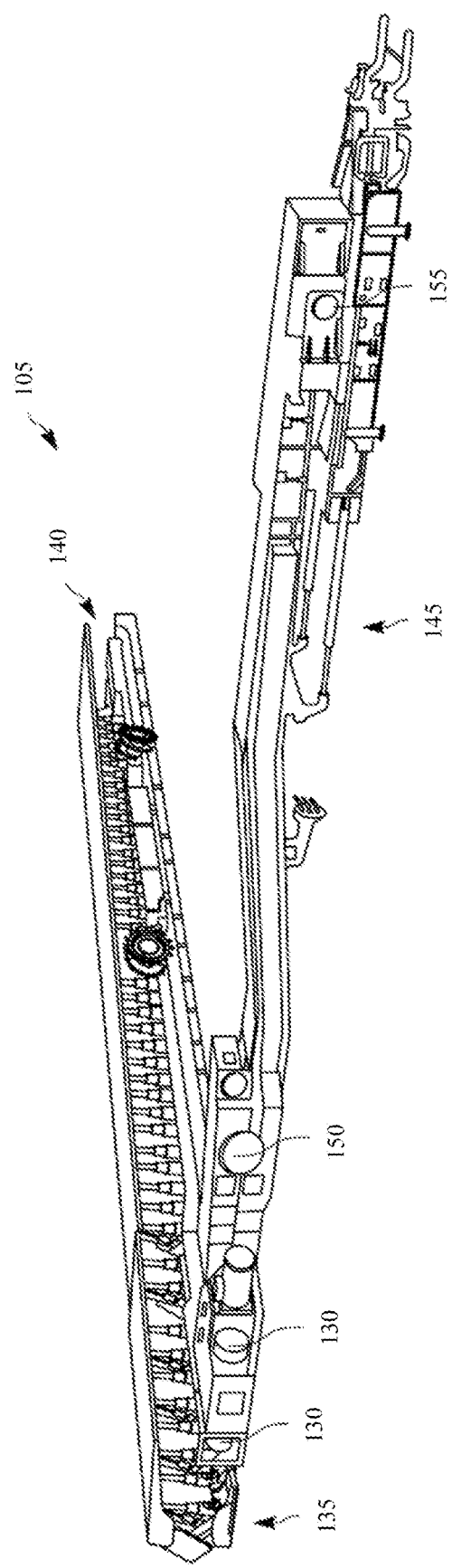

FIG. 3 illustrates a perspective view of the longwall mining system 105 and an expanded view of the BSL 145. When the won material hauled by the AFC 125 reaches the maingate 135, it is routed through a 90° turn onto the BSL 145. In some instances, the BSL 145 interfaces with the AFC 125 at an oblique angle (e.g., a non-right angle). The BSL 145 then prepares and loads the material onto a maingate conveyor (not shown), which transports the material to the surface. The material is prepared to be loaded by a crusher or sizer 150, which breaks down the material to improve loading onto the maingate conveyor. Similar to the conveyor of the AFC 125, the BSL 145's conveyor is driven by a BSL drive 155.

Figure 4A:
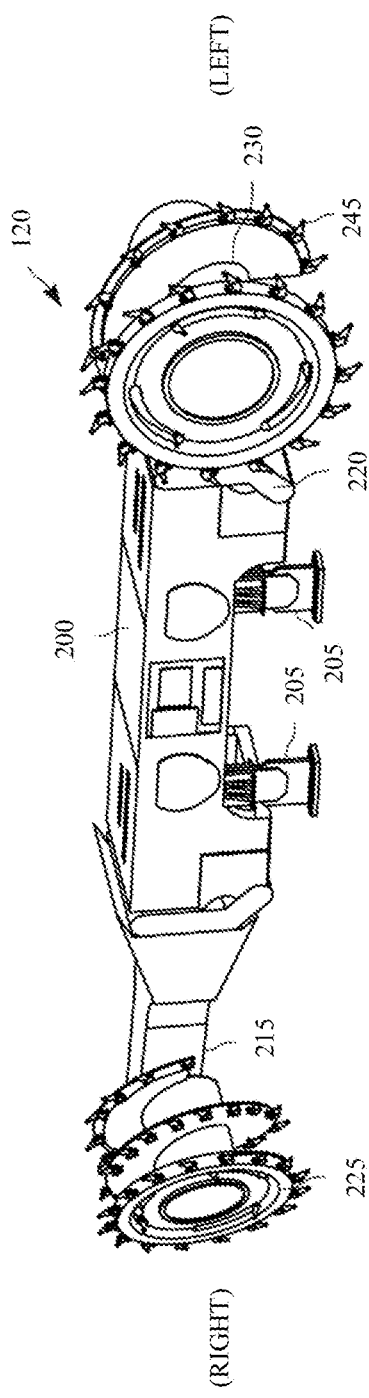
FIGS. 4A, 4B, and 4C illustrate a longwall shearer of the longwall mining system of FIGS. 2 and 3, according to embodiments described herein.
Figure 4B:
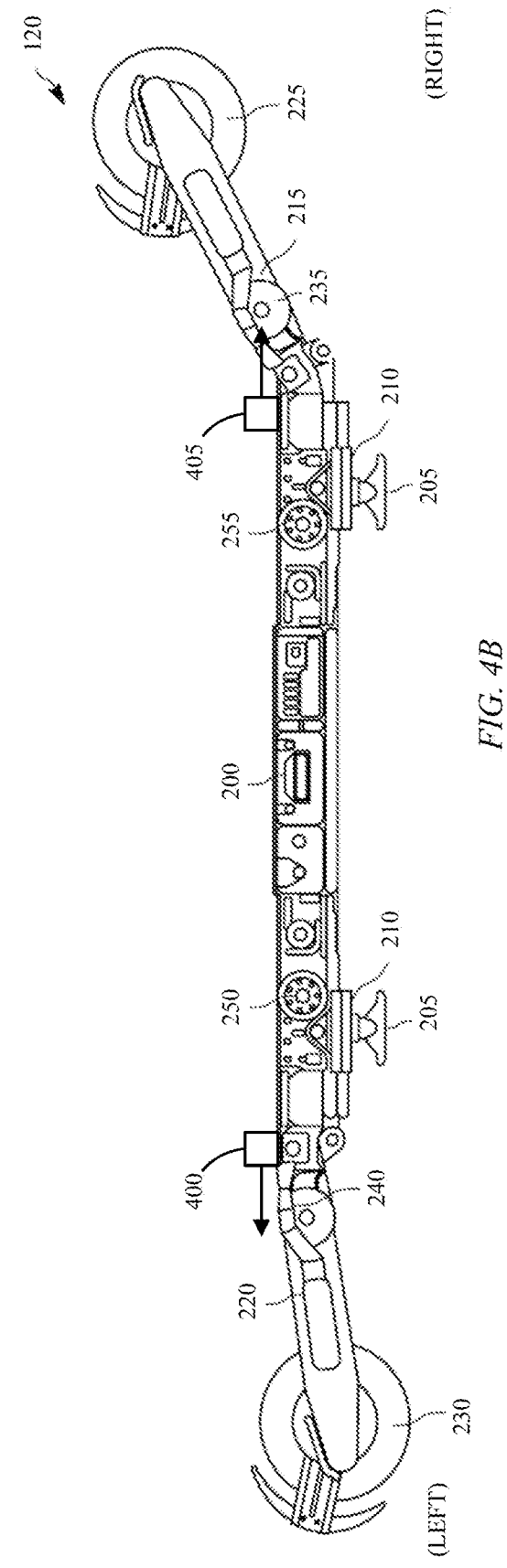
Figure 4C:
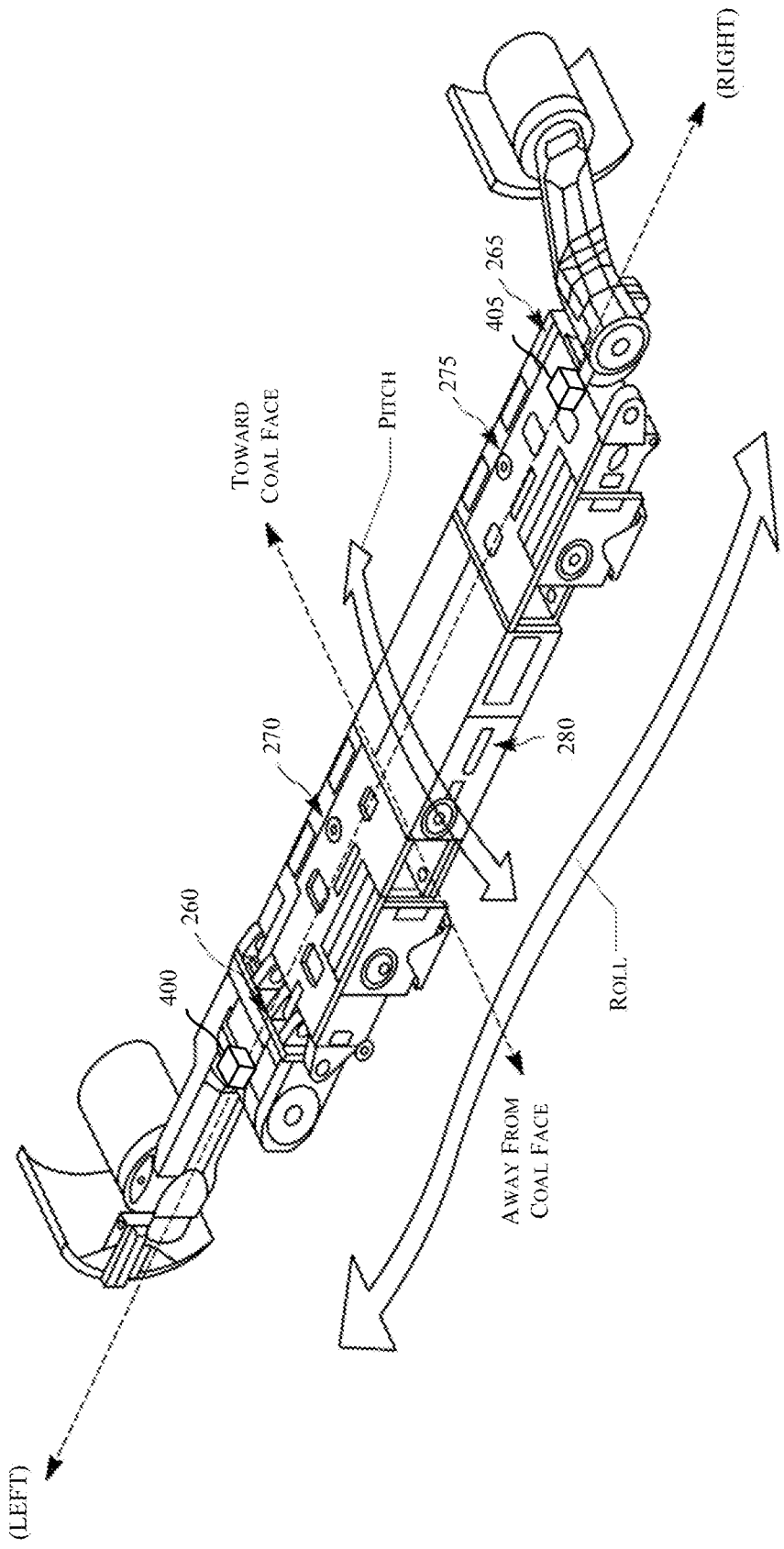

FIGS. 4A, 4B, and 4C illustrate the shearer 120. The shearer 120 includes an elongated central housing 200 that stores the operating controls for the shearer 120. Skid shoes 205 and trapping shoes 210 (FIG. 4B) extend below the housing 200. The skid shoes 205 support the shearer 120 on the face side of the AFC 125 (i.e., the side nearest to the material face) and the trapping shoes 210 support the shearer 120 on the goaf side of the AFC 125. Specifically, the trapping shoes 210 and haulage sprockets engage the rack bar of the AFC 125 to allow the shearer 120 to be propelled along the AFC 125 and material face. Extending laterally from the housing 200 are right and left ranging arms 215 and 220, respectively, which are raised and lowered by hydraulic cylinders attached to the ranging arms 215, 220 and housing 200. On the distal end of the right ranging arm 215 (with respect to the housing 200) is a right cutter drum 225, and on the distal end of the left ranging arm 220 is a left cutter drum 230. Each cutter drum 225, 230 is driven by an electric motor 235, 240 via the gear train within the ranging arm 215, 220. Each of the cutter drums 225, 230 has a plurality of mining bits 245 (e.g., cutting picks) that abrade the material face as the cutter drums 225, 230 are rotated, thereby cutting away the material. The mining bits 245 are also accompanied by spray nozzles that spray fluid during the mining process in order to disperse noxious and/or combustible gases that develop at the excavation site, suppress dust, and enhance cooling. FIG. 4B illustrates a side view of the shearer 120 including the cutter drums 225, 230, ranging arms 215, 220, trapping shoes 210, and housing 200. FIG. 4B also illustrates a left haulage motor 250 and right haulage motor 255.

The shearer 120 also includes various sensors to, for example, enable automatic control of the shearer 120. For example, the shearer 120 includes a left ranging arm inclinometer 260, a right ranging arm inclinometer 265, a left haulage gear sensors 270, a right haulage gear sensors 275, and a pitch angle and roll angle sensor 280. FIG. 4C illustrates the approximate locations of the various sensors. It should be understood that the sensors may be positioned at other locations on the shearer 120. The inclinometers 260, 265 provide information regarding an angle of slope of the ranging arms 215, 220. Ranging arm position could also be measured with linear transducers mounted between each ranging arm 215, 220 and the housing 200. The haulage gear sensors 270, 275 provide information regarding the position of the shearer 120 along the AFC 125 as well as speed and direction of movement of the shearer 120. The pitch and roll angle sensor 280 provides information regarding the angular alignment of the housing 200. As illustrated in FIG. 4C, the pitch of the shearer 120 refers to an angular tilting toward and away from the material face, while the roll of the shearer 120 refers to an angular difference between the right side of the shearer 120 and the left side of the shearer 120, as more clearly illustrated by the axes in FIG. 4C. Both the pitch and the roll of the shearer 120 can be measured in degrees. Positive pitch refers to the shearer 120 tilting away from the material face (i.e., face side of the shearer 120 is higher than the goaf side of the shearer 120), while negative pitch refers to the shearer 120 tilting toward the material face (i.e., face side of the shearer 120 is lower than the goaf side of the shearer 120). Positive roll refers to the shearer 120 tilting so that the right side of the shearer 120 is higher than the left side of the shearer 120, while negative roll refers to the shearer 120 tilting so that the right side is lower than the left side of the shearer 120. The sensors provide information to determine a relative position of the shearer 120, the right cutter drum 225, and the left cutter drum 230.

Figure 5:
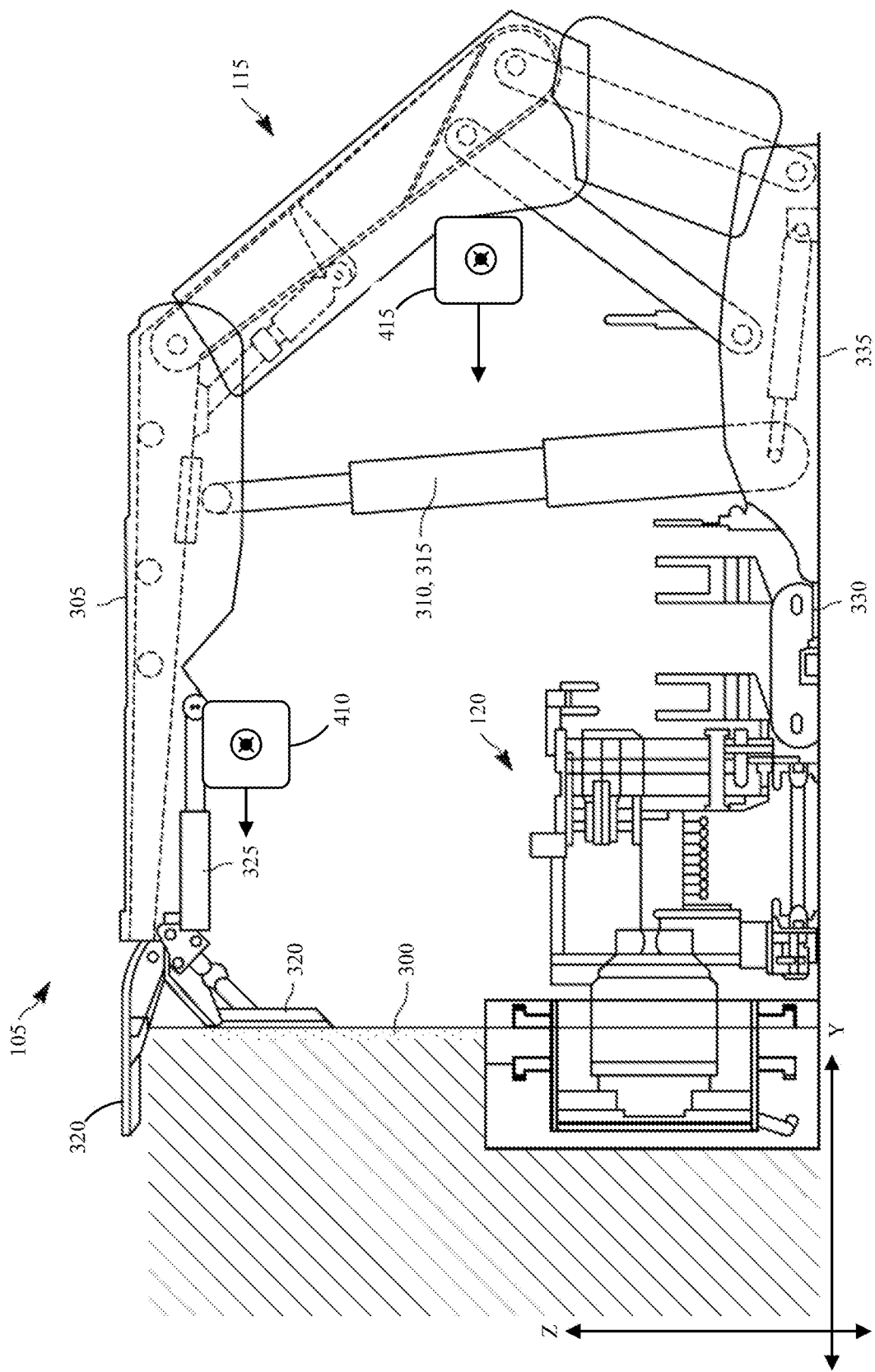
FIG. 5 illustrates a powered roof support of the longwall mining system of FIGS. 2 and 3, according to embodiments described herein.

FIG. 5 illustrates the longwall mining system 105 as viewed along the line of a material face 300. The roof support 115 is shown shielding the shearer 120 from the strata above by an overhanging canopy 305 of the roof support 115. The canopy 305 is vertically displaced (i.e., moved toward and away from the strata) by hydraulic legs 310, 315. The left and right hydraulic legs 310, 315 contain pressurized fluid to support the canopy 305. The canopy 305 exerts a range of upward forces on the geological strata by applying different pressures to the hydraulic legs 310, 315. Mounted to the face end of the canopy 305 is a deflector or sprag 320, which is shown in a face-supporting position in FIG. 5. The sprag 320 can also be fully extended by a sprag ram 325. An advance ram 330 attached to a base 335 allows the roof support 115 to be advanced toward the material face 300 as the layers of material are sheared away to support the newly exposed strata. The advance ram 330 also allows the roof support 115 to push the AFC 125 toward the material face 300.

As illustrated in FIGS. 4B, 4C, and 5, the longwall mining system 105 can also include one or more cameras for visually monitoring the longwall mining system 105. For example, in FIGS. 4B and 4C, the shearer 120 includes a first camera 400 and a second camera 405. The first camera 400 is directed toward the left side of the shearer 120 and toward the left cutter drum 230. As such, the first camera 400 is directed down the material face 300 associated with the longwall mining system 105 to the left of the shearer 120. The second camera 405 is directed toward the right side of the shearer 120 and toward the right cutter drum 225. As such, the second camera 405 is directed down the material face 300 associated with the longwall mining system 105 to the right of the shearer 120. Unlike the other sensors associated with the longwall mining system 105 (e.g., inclinometers 260, 265, haulage gear sensors 270, 275, pitch and roll angle sensor 280, etc.), which provide information related to current and/or prior status of the shearer 120, the cameras 400, 405 are forward looking. In some embodiments, the cameras 400, 405 are used in combination with the left ranging arm inclinometer 260, the right ranging arm inclinometer 265, the left haulage gear sensors 270, the right haulage gear sensors 275, and the pitch angle and roll angle sensor 280 to analyze both past data related to the shearer 120 and mining face 300 and forward looking data.

The cameras 400, 405 provide information related to the horizon of the shearer 120 and a pan-line of the AFC 125.

The pan-line of the AFC 125 represents the floor plane of the AFC 125 and corresponds to the path followed by the shearer 120 as it traverses the AFC 125. Accordingly, rather than reacting to the condition or shape of the pan-line, the cameras 400, 405 enable a proactive approach of compensating for the condition or shape of the pan-line.

Additionally or alternatively, one or more cameras can be positioned on a roof support, such as the roof support 115 of FIG. 5. In FIG. 5, the roof support 115 is illustrated as including a camera 410 and a camera 415. Each camera 410, 415 can be oriented such that the camera is directed to a material face 300 and/or down the pan-line. The cameras 410, 415 are illustrated with both a dot and a cross to indicate that, with respect to the plane of FIG. 5, the cameras 410, 415 can either be directed into FIG. 5 (i.e., looking down the right side of the shearer 120 and pan-line) or directed out of FIG. 5 (i.e., looking down the left side of the shearer 120 and pan-line). In embodiments that include the cameras 410, 415 that are mounted to a roof support 115, additional cameras can be mounted to additional roof supports (e.g., at regular intervals) such that an entire pan-line can be monitored regardless of the position of the shearer 120. The cameras 400, 405 on the shearer 120 and the cameras 410, 415 on the roof support 115 can be used separately or in combination with one another by the longwall mining system 105. As a result, the longwall mining system 105 can proactively control the shearer 120 and/or roof supports 115 based on the condition or shape of the pan-line ahead of the shearer 120 as the shearer 120 travels down the material face 300.

Figure 6:
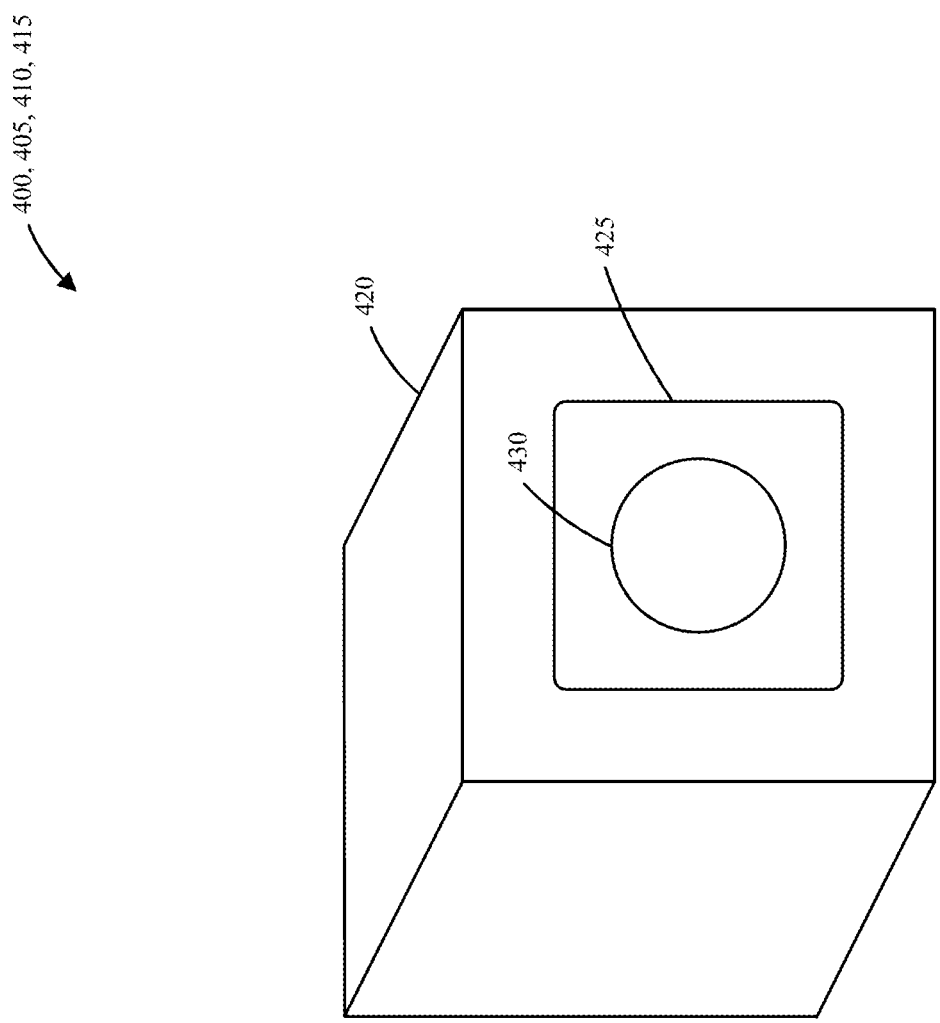
FIG. 6 illustrates a camera for use in the longwall mining system of FIGS. 2 and 3, according to embodiments described herein.

FIG. 6 illustrates one of the cameras 400, 405, 410, 415 in greater detail. As illustrated in FIG. 6, each of the cameras 400, 405, 410, 415 can include a camera housing 420, an aperture or lens 425, and a camera sensor 430. The camera housing 420 is operable to protect the camera sensor 430 from dirt, debris, and damage in a mining environment. In some embodiments, the camera housing 420 is designed to be explosion proof ("XP") and/or intrinsically safe ("IS"). The lens 425 also provides protection to the camera sensor 430. However, because the lens 425 is transparent, the lens 425 can be covered with dirt or debris that can limit the visibility of the camera sensor 430. In some embodiments, veining on, for example, the shearer 120 can be used to direct airflow over the lens 425 of one or more of the cameras 400, 405, 410, 415. The airflow over the lens 425 is operable to loosen and clear dirt or debris that accumulates on the lens 425. Additionally or alternatively, a water pump or water jet can be used to spray water onto the lens 425 to clear dirt and debris from the lens 425.

The camera sensor 430 of the cameras 400, 405, 410, and 415 can be a visible light sensor, an infrared light sensor, etc. In some embodiments, the camera sensor 430 is capable of sensing both visible light and infrared light, or the camera sensor 430 includes multiple sensors such that one sensor is capable of sensing visible light and a second sensor is capable of sensing infrared light. In some embodiments, one or more of the cameras 400, 405, 410, 415 includes a light sensor for sensing an amount of light in the vicinity of the one or more cameras 400, 405, 410, 415. If the light sensor senses an adequate amount of light (e.g., equal to or above a threshold radiant power) in the vicinity of the one or more cameras 400, 405, 410, 415, the one or more cameras 400, 405, 410, 415 sense using a visible light sensor. If the light sensor senses an inadequate amount of light (e.g., below the threshold radiant power) in the vicinity of the one or more cameras 400, 405, 410, 415, the one or more cameras 400, 405, 410, 415 sense using the infrared light sensor or the visible light sensor in combination with the infrared light sensor. In some embodiments, an infrared light image can be overlaid on top of a visible light image to create an enhanced image.

Figure 7:
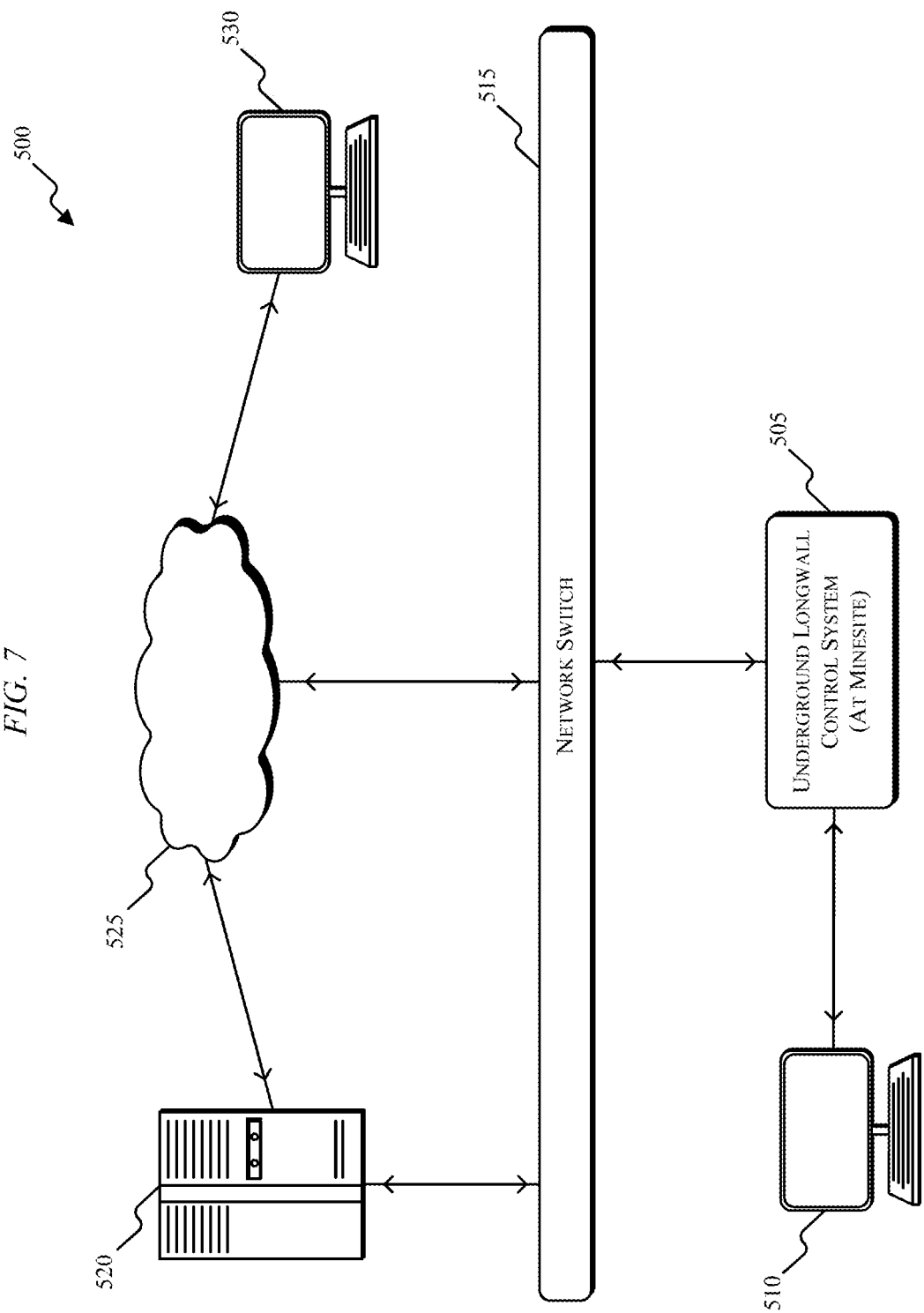
FIG. 7 illustrates a mine monitoring system, according to embodiments described herein.

FIG. 7 illustrates a mine monitoring system 500 that can be used to detect and respond to issues arising in an underground longwall control system or controller 505. The controller 505 is, for example, located at the mining site and includes various components and controls of the shearer 120. In some embodiments, the controller 505 also include various components and controls of the roof supports 115, the AFC 125, and the like. The controller 505 is in communication with an underground computer or user interface 510 and a surface computer or server 520 via a network switch 515, both of which can also be located at the mine site. The surface computer 520 is further in communication with a remote monitoring computer 530 over a network 525. The remote monitoring computer 530 can be configured to process data received from the surface computer 520 and/or through the network switch 515 from the controller 505.

Each of the components in the mine monitoring system 500 can be communicatively coupled for bi-directional communication. The communication paths between any two components of the mine monitoring system 500 may be wired (e.g., via Ethernet cables), wireless (e.g., via WiFi®, cellular, Bluetooth® protocols), or a combination thereof. Although only an underground longwall mining system and a single network switch is illustrated in FIG. 7, additional mining machines both underground and surface-related (and alternative to longwall mining) may be coupled to the surface computer 520 via the network switch 515. Similarly, additional network switches or connections may be included to provide alternate communication paths between the controller 505 and the surface computer 520.

Figure 8:
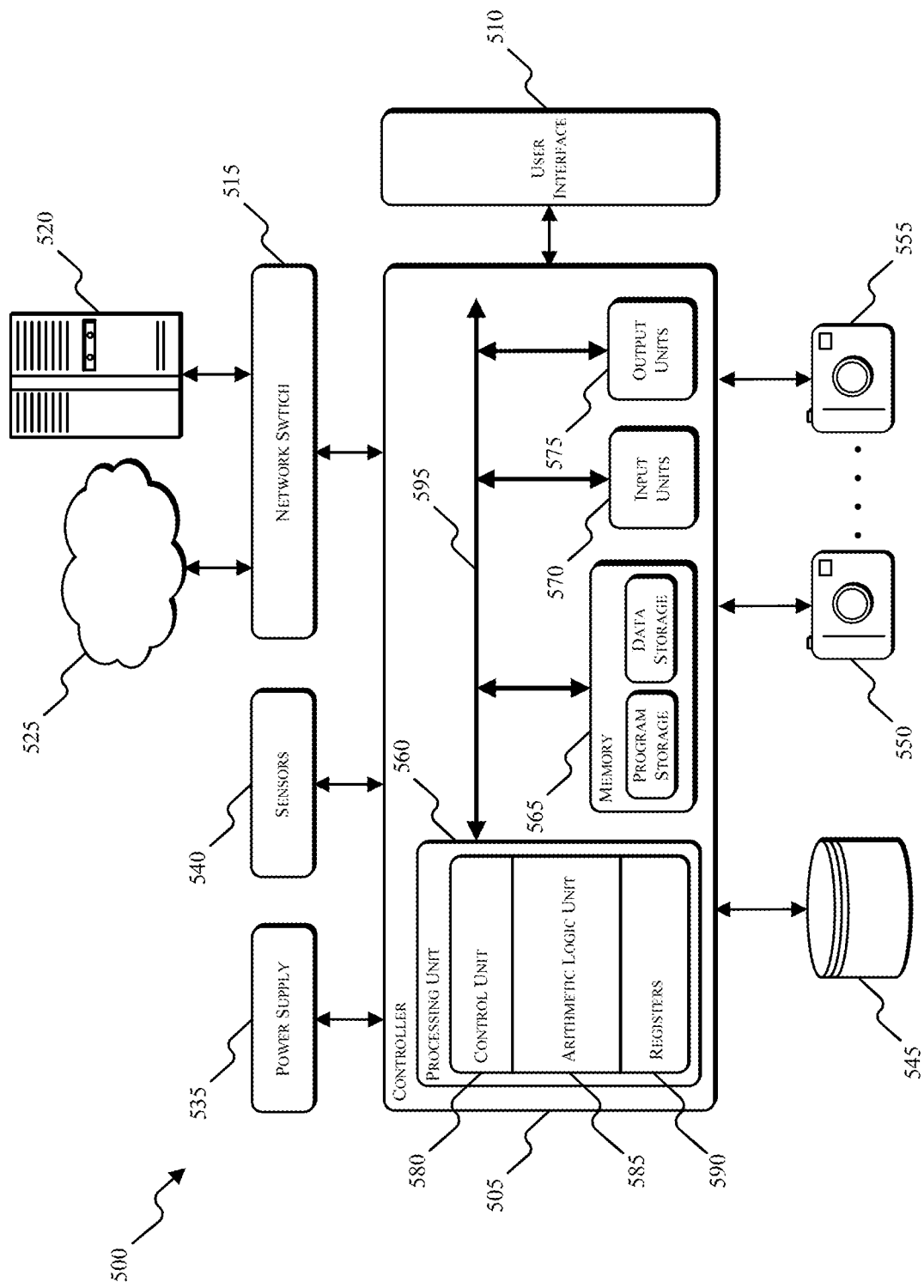
FIG. 8 illustrates a controller for the mine monitoring system of FIG. 7, according to embodiments described herein.

The mine monitoring system 500 and the controller 505 are illustrated in greater detail with respect to FIG. 8. The controller 505 is electrically and/or communicatively connected to a variety of modules or components of the longwall mining system 105. For example, the controller 505 is connected to the underground computer or user interface 510, the network switch 515, the surface computer or server 520 (via network switch 515), the network 525 (via network switch 515), a power supply module 535 (e.g., an AC power supply module receiving AC mains power), one or more sensors 540 related to the longwall mining system 105, a database 545 (e.g., for storing images or video related to the longwall mining system 105, component profiles, etc.), a first camera 550, and a second camera 555. Although only a first camera 550 and a second camera 555 are illustrated with respect to the mine monitoring system 500, additional cameras can be included. For example, the monitoring system can include each of cameras 400, 405, 410, and 415. In some embodiments, more than four cameras are included in the mine monitoring system 500, and the number of cameras included in the mine monitoring system 500 varies based on the size of the material face 300.

The controller 505 includes combinations of hardware and software that are operable to, among other things, control the operation of the longwall mining system 105, communicate with the surface computer 520 or over the network 525, detect a pan-line of the longwall mining system 105, generate a forward-looking mine profile, etc. In some embodiments, the controller 505 includes a plurality of electrical and electronic components that provide power, operational control, and protection to the components and modules within the controller 505 and/or longwall mining system 105. For example, the controller 505 includes, among other things, a processing unit 560 (e.g., a microprocessor, a microcontroller, or another suitable programmable device), a memory 565, input units 570, and output units 575. The processing unit 560 includes, among other things, a control unit 580, an arithmetic logic unit ("ALU") 585, and a plurality of registers 590 (shown as a group of registers in FIG. 8), and is implemented using a known computer architecture (e.g., a modified Harvard architecture, a von Neumann architecture, etc.). The processing unit 560, the memory 565, the input units 570, and the output units 575, as well as the various modules connected to the controller 505 are connected by one or more control and/or data buses (e.g., common bus 595). The control and/or data buses are shown generally in FIG. 8 for illustrative purposes. The use of one or more control and/or data buses for the interconnection between and communication among the various modules and components would be known to a person skilled in the art in view of the invention described herein.

The memory 565 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 560 is connected to the memory 565 and executes software instructions that are capable of being stored in a RAM of the memory 565 (e.g., during execution), a ROM of the memory 565 (e.g., on a generally permanent basis), or another non-transitory computer readable medium such as another memory or a disc. Software included in the implementation of the longwall mining system 105 can be stored in the memory 565 of the controller 505. The software includes, for example, firmware, one or more applications, program data, filters, rules, one or more program modules, optical flow image processing software, an edge detection algorithm (e.g., a simultaneous localization and mapping ["SLAM"]), and other executable instructions. The controller 505 is configured to retrieve from the memory 565 and execute, among other things, instructions related to the control processes and methods described herein. In other constructions, the controller 505 includes additional, fewer, or different components. In some embodiments, the software included in the implementation of the longwall mining system 105 can be stored in a memory of the surface computer 520 or the remote monitoring computer 530. In such embodiments, the surface computer 520 or the remote monitoring computer 530 is configured to retrieve from the memory and execute instructions related to the control processes and methods described herein (e.g., optical flow image processing software, an edge detection algorithm, etc.).

The sensors 540 include the left ranging arm inclinometer 260, the right ranging arm inclinometer 265, the left haulage gear sensors 270, the right haulage gear sensors 275, and the pitch angle and roll angle sensor 280, as previously described with respect to FIG. 4C. These sensors 540 can be used by the controller 505 in a backward-looking manner to characterize current and/or former state of shearer 120 or the pan-line associated with the longwall mining system 105. Such a backward-looking longwall mining system is described in U.S. Pat. No. 9,726,017, granted Aug. 8, 2017 and entitled "HORIZON MONITORING FOR LONGWALL SYSTEM," the entire content of which is hereby incorporated by reference. However, the controller 505 can also use the cameras 550 and 555 in a forward-looking manner to characterize the future state of the pan-line associated with the longwall mining system 105 that the shearer 120 is going to experience.

The cameras 550, 555 capture images or video of the areas near the shearer 120 or roof supports 115. In embodiments where the cameras 550, 555 are mounted on the shearer 120, the controller 505 determines a direction of motion of the shearer 120. Based on the direction of motion of the shearer 120, the controller 505 is configured to analyze images or video captured from one of the cameras 550, 555. In some embodiments, based on the direction of motion of the shearer 120, the controller 505 selectively turns one of the cameras 550, 555 ON and the other camera OFF such that the controller 505 only receives images or video signals from one of the cameras 550, 555. In other embodiments, the controller 505 receives image or video signals from each of the cameras 550, 555 and can ignore the signals received from the one of the cameras 550, 555 facing away from the shearer 120's current direction of movement. Ignoring signals from one of the cameras 550, 555 includes, for example, discarding the signals, not processing the signals, not performing edge detection or optical flow image processing using the signals, or not controlling the longwall mining system 105 based on the signals. Because the shearer 120 only travels in one direction at a time, only a front- or forward-looking one of the cameras 550, 555 is needed to evaluate the upcoming pan-line that the shearer 120 is to experience and generate a forward-looking mine profile.

In embodiments where the cameras 550, 555 are mounted on a roof support 115, the controller 505 can determine a position and direction of motion of the shearer 120 based on images or video received from multiple cameras. In other embodiments, the controller 505 determines the position and direction of motion of the shearer 120 based on other sensors associated with the shearer 120. For example, in embodiments where the cameras 550, 555 are mounted on a roof support 115, a plurality of cameras 550, 555 are included in the longwall mining system 105 to ensure that the entire length of the AFC 125 can be captured. Images or video from each camera included in the longwall mining system 105 can be evaluated to determine a position and direction of motion of the shearer 120 along the AFC 125. In some embodiments, an image processing algorithm can be used to detect the position of the shearer 120 from one or more images or one or more video streams from the cameras 550, 555. For example, the controller 505 includes computer executable instructions for performing edge detection and optical flow image processing within one or more images or video streams. In some embodiments, the controller 505 is configured to implement a SLAM detection technique (e.g., to detect differences between an expected shearer shape and a sensed shearer shape). In other embodiments, other edge detection techniques can be implemented by the controller 505, such as a canny edge detector or another first-order edge detection method, a second-order edge detection method (e.g., differential techniques), phase congruency, phase stretch transform, etc. The controller 505 uses optical flow image processing to, for example, compute the motion of pixels from one image or image frame from to the next image or image frame. The pixel changes from image or image frame enable the controller to track the motion of components of the longwall mining system 105. The controller 505 can be configured to implement one or more optical flow image processing techniques, such as a phase correlation method, a block-based method, a differential method (e.g., Horn-Schunck method, Buxton-Buxton method, Black-Jepson method, etc.), or discrete optimization methods.

The image or video analysis technique implemented by the controller 505 is customized or specialized to a longwall mining system, such as the longwall mining system 105. As a result, the controller 505 is able to implement an image or video analysis technique for the purpose of identifying particular features of the longwall mining system 105. As previously described, in some embodiments, the controller 505 is configured to detect the shearer 120 in addition to detecting the pan-line. For example, the housing 200 has a consistent shape even as the ranging arms 215, 220 are articulated. The controller 505 receives image or video signals from the cameras 550, 555, detects the edges within the captured image or video signals, and compares the detected edge shapes to the known geometry or structure of the housing 200. In some embodiments, the memory 565 or the database 545 stores one or more models of what the housing 200 (or any other component of the longwall mining system 105) looks like for the purposes of comparison to detected edges. As a result, the controller 505 is configured to detect one or a plurality of objects within the longwall mining system 105 for the purposes of identifying the location of the objects or detecting the shape of a pan-line. The controller 505 can also detect how the one or plurality of objects change from image to image using optical flow image processing.

In embodiments where the cameras 550, 555 are facing down the material face 300, the cameras 550, 555 facing the direction of motion of the shearer 120 (i.e., a forward-looking camera) generates signals that are received by the controller 505. The controller processes and analyzes the signals from the cameras 550, 555 as described above by performing edge detection to identify components or features of the longwall mining system 105. For example, the controller 505 can be configured to identify the individual segments (e.g., linked ridged segments) of the AFC 125 or a top edge of a spill tray. The AFC 125 follows the pan-line of the mine as the pan-line rises and falls (i.e., in a vertical Z direction [see FIG. 5]) or extends toward or away from the roof supports 115 (i.e., in a horizontal Y direction [see FIG. 5]).

The controller 505 is configured to determine the shape of the pan-line that the shearer 120 is soon to experience from a combination of several segments of the AFC 125. Additionally or alternatively, the controller 505 is configured to identify the canopy 305 of each roof support 115. Similar to the segments of the AFC 125, the roof supports can follow the pan-line of the material face 300. By identifying the boundaries of a canopy 305 and combining several canopies together, the controller 505 is configured to determine the shape of the pan-line that the shearer 120 is soon to experience. The segments of the AFC 125 and the canopy 305 of a roof support 115 are provided as illustrative examples of features that the controller 505 could use to identify the pan-line of the material face 300 forward of the shearer 120. In some embodiments, additional or different features of the longwall mining system 105 can be used alone or in combination to detect the pan-line when the features follow the pan-line and are, for example, consistently identifiable along the length of the material face 300. In some embodiments, the determined shape of the pan-line can also be compared to a prior imaged version of the pan-line so the controller 505 can determine changes to the pan-line from previous shearer cycles.

When the shearer 120 reaches the end of the AFC 125, the shearer 120 is controlled to travel in the opposite direction along the AFC 125. As a result, in embodiments where the cameras 550, 555 are mounted on the shearer 120, the controller 505 can switch between cameras 550, 555 to again process and analyze images or video signals from the one of the cameras 550, 555 that is facing in the direction of motion of the shearer 120.

Figure 9:
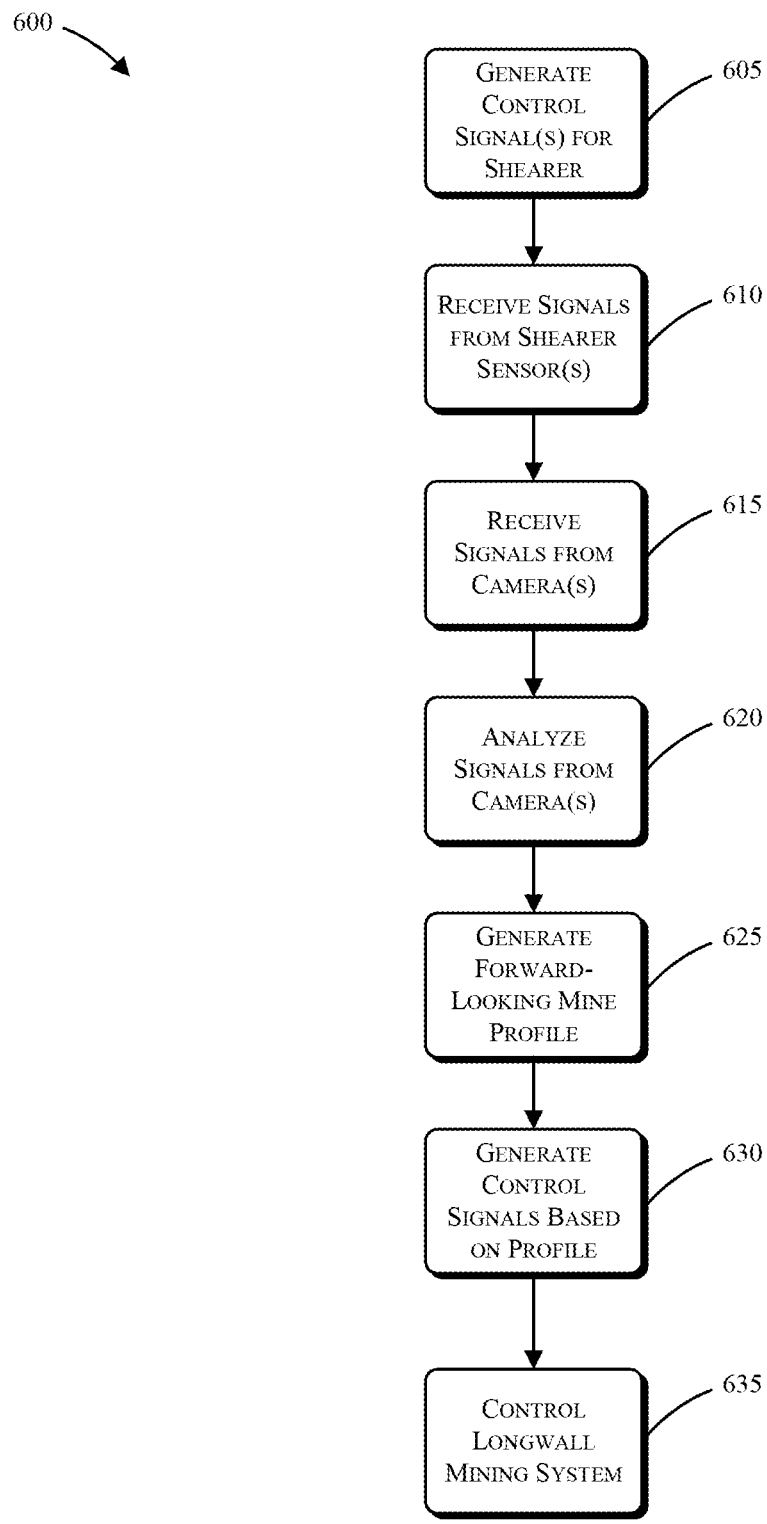
FIG. 9 is a process for controlling the longwall mining system of FIGS. 2 and 3, according to embodiments described herein.

FIG. 9 is a process 600 for controlling the longwall mining system 105. The process 600 begins with the operation of the longwall mining system 105 and the controller 505 generating one or more control signals for the shearer 120 of the longwall mining system 105 (STEP 605). The control signals include, for example, signals related to the shearer 120 moving along the AFC 125. As the controller 505 is controlling the shearer 120, the controller 505 receives signals from a plurality of the sensors (STEP 610). The signals from the sensors include signals from, among other things, the left ranging arm inclinometer 260, the right ranging arm inclinometer 265, the left haulage gear sensors 270, the right haulage gear sensors 275, and the pitch angle and roll angle sensor 280. The controller 505 is configured to use these received signals to control the operation of the shearer 120 and/or generate a mine profile associated with the longwall mining system 105. The mine profile generated by the controller 505 can include a pan-line profile, a roof cut profile, a floor cut profile, a pitch profile, an elevation profile, or the like. Such profiles generated by the controller 505 correspond to past sensor data that was received by the controller 505 and compiled into the desired profile(s). However, these profiles are backward-looking because they represent what the shearer 120 has already experienced (e.g., a profile for the previous cycle of the shearer 120 moving along the AFC 125).

The controller 505 is also configured to control the operation of the longwall mining system 105 in a forward-looking manner. The controller 505 receives one or more image or video signals from the cameras 550, 555 (STEP 615). The controller analyzes the image or video signals from the cameras 550, 555 as described above to detect, for example, the edges of one or more components of the longwall mining system 105 (e.g., roof supports 115, shearer 120, AFC 125, etc.) (STEP 620). Based on the analyzed image or video signals from the cameras 550, 555, the controller 505 generates a forward-looking mine profile (STEP 625). The forward-looking mine profile includes, for example, a visual representation of the pan-line. The visual representation can be reproduced on a display (e.g., on the underground computer 510 or remote monitoring computer 530) or can remain in data form for processing and control by the controller 505. In some embodiments, the forward-looking mine profile can also include a forward-looking roof cut profile, a forward-looking floor cut profile, a forward-looking pitch profile, a forward-looking elevation profile, etc. The various types of forward-looking profiles that can be included in the generated forward-looking mine profile can be generated in the manner described above by detecting the edges of various components of the longwall mining system 105. For example, a roof cut profile can be generated based on detected edges of the roof supports 115 and a pan-line profile can be generated based on detected edges of the AFC 125. The forward-looking mine profile generated by the controller 505 can also include calculated or estimated parameters of the longwall mining system 105. For example, parameters of the longwall mining system that can be determined from the forward-looking profile include a floor step parameter, an extraction parameter, a pitch parameter, a roll rate parameter, etc., for the portion of the material face 300 the shearer 120 is about to experience. These and other parameters associated with a longwall mining system are described in U.S. Pat. No. 9,726,017, the entire content of which was previously incorporated by reference.

Unlike backward-looking longwall mining systems, a forward-looking longwall mining system using the cameras 550, 555 is capable of pre-emptively controlling the longwall mining system 105 based on what the shearer 120 is going to experience (i.e., not based solely on what the shearer has already experienced). For example, the forward-looking mine profile can include a floor step parameter related to future elevation changes in the pan-line. Backward-looking longwall systems could only react to these changes by alerting an operator that an elevation changed had previously occurred and, for example, less material was extracted than was desired. The forward-looking profile can be used to generate one or more control signals (STEP 630) to control the operation of the longwall mining system 105 (STEP 635).

The control signals include control signals for the roof supports 115, shearer 120, AFC 125, etc. For example, the forward-looking mine profile is used by the controller 505 to control the height or advance of the roof supports 115 ahead of the shearer 120. The forward-looking mine profile can also be used to control the right ranging arm 215, the right cutter drum 225, the left ranging arm 220, and left cutter drum 230 to more effectively remove material from the material face 300. The forward-looking mine profile can also be used to control the AFC 125 (e.g., a rotational speed of the AFC drives 130) to more effectively remove material from the mine (e.g., based on an amount of material expected to be extracted). Controlling the roof supports 115, shearer 120, and AFC 125 based on the forward-looking mine profile are exemplary controls for the longwall mining system 105. However, other components of the longwall mining system 105 can also be controlled based on the forward-looking mine profile (e.g., BSL 145, crusher or sizer 150, etc.). Additionally, the steps of the process 600 are illustrated in an exemplary order. However, various steps of the illustrated process 600 are capable of being removed from the process 600 or performed in a different order than the particular order illustrated in FIG. 9. For example, the process 600 can be modified such that signals from the sensors 540 and signals from the cameras 550, 555 are received and processed by the controller 505 before the shearer 120 is controlled to move along the AFC 125.

Thus, embodiments described herein provide, among other things, systems and methods for controlling a longwall mining system based on a forward-looking mine profile. Various features and advantages of the invention are set forth in the following claims.

What is claimed is:

1. A longwall mining system comprising:
   an armored face conveyer;
   a shearer configured to travel along the armored face conveyor in a first direction or a second direction, the shearer including a shearer housing, a first cutter drum extended in the first direction away from the shearer housing, and a second cutter drum extended in the second direction away from the shearer housing;
   a first camera configured to generate a first signal associated with the first direction of travel for the shearer;
   a second camera configured to generate a second signal associated with the second direction of travel for the shearer; and
   a controller including a non-transitory computer readable medium and a processor, the controller comprising computer executable instructions stored in the computer readable medium for controlling operation of the longwall mining system to:
   receive the first signal from the first camera,
   receive the second signal from the second camera,
   analyze at least one of the first signal and the second signal to identify one or more edges of a structure of the longwall mining system ahead of the shearer in either the first direction or the second direction,
   generate a forward-looking mine profile based on the one or more edges, and
   control the longwall mining system based on the forward-looking mine profile.

2. The longwall mining system of claim 1, wherein the first camera and the second camera are mounted on the shearer housing.

3. The longwall mining system of claim 1, wherein the structure of the longwall mining system ahead of the shearer is the armored face conveyor.

4. The longwall mining system of claim 3, wherein the one or more edges represent a pan-line of the shearer.

5. The longwall mining system of claim 4, wherein the computer executable instructions stored in the computer readable medium to control the longwall mining system based on the forward-looking mine profile include computer executable instructions to control one of the first cutter drum and the second cutter drum.

6. The longwall mining system of claim 4, wherein the computer executable instructions stored in the computer readable medium to control the longwall mining system based on the forward-looking mine profile include computer executable instructions to control the armored face conveyor.

7. The longwall mining system of claim 1, the controller further comprising computer executable instructions stored in the computer readable medium for controlling operation of the longwall mining system to:
   execute a simultaneous localization and mapping ("SLAM") algorithm to identify the one or more edges of the structure of the longwall mining system.

8. The longwall mining system of claim 1, wherein the first camera is configured to sense both visible light and infrared light, and wherein the second camera is configured to sense both visible light and infrared light.

9. The longwall mining system of claim 1, wherein the first camera is mounted on a roof support of the longwall mining system, the roof support configured to shield the shearer from overlying geological strata.

10. A computer-implemented method for controlling a longwall mining system, the longwall mining system including an armored face conveyor, a shearer configured to travel along the armored face conveyor in a first direction or a second direction, a first camera, a second camera, and a controller, the method comprising:
   receiving a first signal from the first camera;
   receiving a second signal from the second camera;
   analyzing at least one of the first signal and the second signal to identify one or more edges of a structure of the longwall mining system ahead of the shearer in either the first direction of travel of the shearer or the second direction of travel of the shearer;
   generating a forward-looking mine profile based on the one or more edges; and
   controlling the longwall mining system based on the forward-looking mine profile.

11. The method of claim 10, wherein the structure of the longwall mining system ahead of the shearer is the armored face conveyor.

12. The method of claim 11, wherein the one or more edges represent a pan-line of the shearer.

13. The method of claim 12, wherein controlling the longwall mining system based on the forward-looking mine profile includes controlling one of a first cutter drum and a second cutter drum.

14. The method of claim 13, wherein controlling one of the first cutter drum and the second cutter drum includes raising or lowering one of the first cutter drum and the second cutter drum.

15. The method of claim 12, wherein controlling the longwall mining system based on the forward-looking mine profile includes controlling the armored face conveyor.

16. The method of claim 10, further comprising:
executing a simultaneous localization and mapping ("SLAM") algorithm to identify the one or more edges of the structure of the longwall mining system.

17. A controller for controlling a longwall mining system, the controller including a non-transitory computer readable medium and a processor, the controller comprising computer executable instructions stored in the computer readable medium for controlling operation of the longwall mining system to:
receive a first signal from a first camera;
receive a second signal from a second camera;
analyze at least one of the first signal and the second signal to identify one or more edges of a structure of the longwall mining system ahead of a shearer in either a first direction of travel of the shearer or a second direction of travel of the shearer;
generate a forward-looking mine profile based on the one or more edges; and
control the longwall mining system based on the forward-looking mine profile.

18. The controller of claim 17, wherein the structure of the longwall mining system ahead of the shearer is the armored face conveyor.

19. The controller of claim 18, wherein the one or more edges represent a pan-line of the shearer.

20. The controller of claim 19, wherein the computer executable instructions stored in the computer readable medium to control the longwall mining system based on the forward-looking mine profile include computer executable instructions to control one of a first cutter drum and a second cutter drum.

21. The controller of claim 19, wherein the computer executable instructions stored in the computer readable medium to control the longwall mining system based on the forward-looking mine profile include computer executable instructions to control the armored face conveyor.

22. The controller of claim 17, further comprising computer executable instructions stored in the computer readable medium for controlling operation of the longwall mining system to:
execute a simultaneous localization and mapping ("SLAM") algorithm to identify the one or more edges of the structure of the longwall mining system.

* * * * *